July 13, 1948.  C. W. WOODS  2,445,287
LIQUID FILTERING MECHANISM
Filed Dec. 29, 1944  2 Sheets-Sheet 1

Inventor
C. W. Woods
By Arthur H. Sturges
Attorney

July 13, 1948.  C. W. WOODS  2,445,287
LIQUID FILTERING MECHANISM
Filed Dec. 29, 1944  2 Sheets-Sheet 2
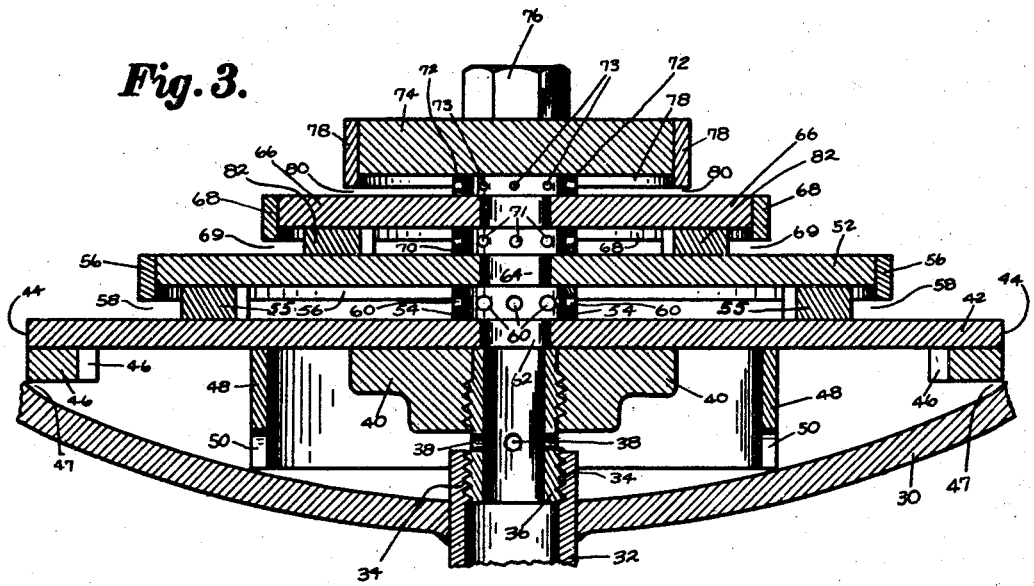

Patented July 13, 1948

2,445,287

UNITED STATES PATENT OFFICE 2,445,287

LIQUID FILTERING MECHANISM

Clayton W. Woods, Omaha, Nebr.

Application December 29, 1944, Serial No. 570,243

6 Claims. (Cl. 210—171)

The present invention relates to the water softening art and the like, including liquid filtration systems and has for an object to provide a device, the parts of which are so constructed and cooperatively assembled with respect to each other that liquids received in the top of a filtering tank are distributed and caused to descend evenly with respect to the cross sectional area of the tank and through the filtering material within the tank during a flow of the liquid outwardly of said tank; said device being also adapted to disburse liquids during an inflow of liquid upwardly from the bottom of said tank in such a manner that an upward flow of the liquid is evenly distributed through said material.

Another object of the invention is to provide a device for the above stated purposes which is so constructed that the necessity, as heretofore practiced, of frequently removing the filtering material from a tank for cleaning debris from the manifold system of said tank is eliminated.

A further object of the invention is to provide a device for the above stated purposes which is so constructed that no particles of the granulated filtering material nor particles of the bed of supporting gravel for supporting said material are permitted to contact with the outlet passageways of the new device.

A still further object of the invention is to provide a device for the above stated purposes which is so constructed that the heretofore utilized strainer nozzles are not needed for successful filtering operations.

Another object of the invention is to provide a device so constructed that the slab of concrete heretofore employed adjacent to the bottom of and within a filtering tank, is eliminated.

A further object of the invention is to provide a device so constructed that it can be conveniently installed in a tank at a factory by mechanics familiar with the art and in lieu of common labor installation made at the site of use of the tank as heretofore practiced, whereby efficiency is enhanced.

Other and further objects and advantages of the invention will be understood from the following detailed description thereof.

In the drawings,

Figure 3 is a transverse vertical section, on an enlarged scale, of a one-fourth segment of the new device, the view being taken approximately along the line 3—3 of Figure 2 and looking in the direction of the arrows; the view being turned 180 degrees with respect to the showing in Figure 2.

Figure 4 is a top plan view of a spacing ring preferably employed.

Figure 5 is a transverse section of said ring on line 5—5 of Figure 4.

Figure 6 is a top plan view of a plate employed, and

Figure 7 is a transverse section of said plate, the view being taken on line 7—7 of Figure 6.

Figures 1, 2:
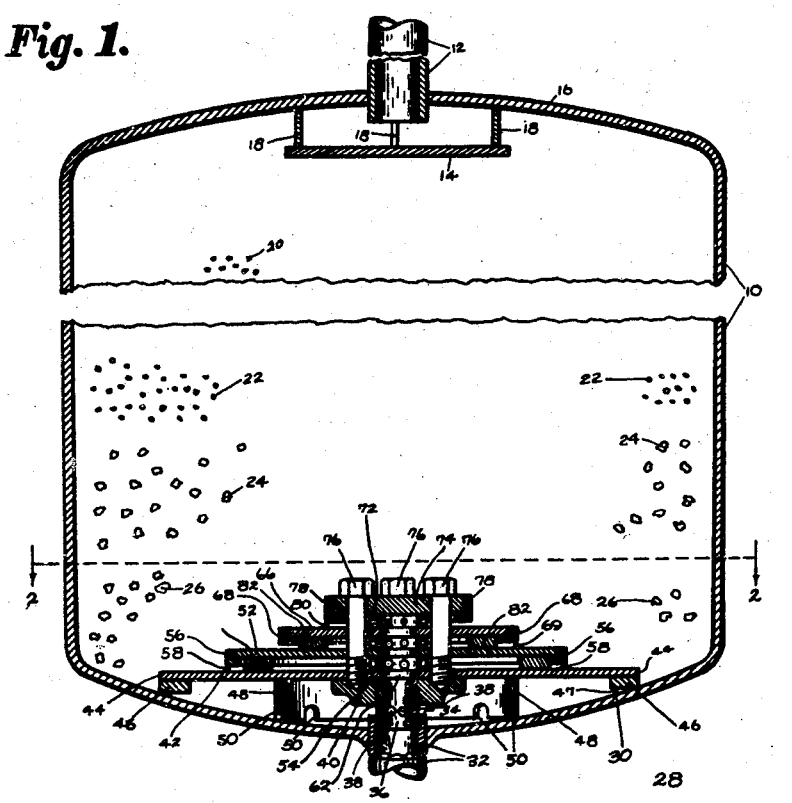
Figure 1 is a vertical sectional view of a filtering tank, certain portions thereof being broken away and others showing in section, and depicting an embodiment of the present invention operatively associated therewith, the view being taken substantially on line 1—1 of Figure 2.
Figure 2 is a section taken on line 2—2 of Figure 1 and showing a top plan view of the new device, certain portions of the latter being broken away.

It is well known that as heretofore practiced, filtering tanks have laminations of filtering material disposed upon gravel or layers of the latter and employ a main medially disposed conduit, the latter having numerous lateral and horizontally disposed branches, said branches being arranged radially with respect to said main vertically disposed inlet pipe. The branches are equipped with small orifices for the passage of liquid therethrough; said laminations of comparatively heavy material, such as gravel and the like, often become compacted against the outlet orifices of said horizontally disposed pipes and minute particles become lodged in said openings resultant from the weight of the said material, whereby at times when liquid to be filtered is introduced into said lateral outlet branches and even at times when said liquid is under an appreciable pressure, the latter fails to dislodge said minute particles from said outlets, whereby in the course of time said outlets become plugged and nonoperative, thereby necessitating a disassembly of all parts of the apparatus for cleaning purposes and at a proportional expense for labor and the like. Also systems of the prior art contain a plurality of small strainer nozzles which are screwed into a manifold of pipes or lateral branches and a distribution of liquid depends upon the passage thereof through the small orifices of the said strainer nozzles. Over a period of time, corrosion and sometimes electrolysis will cause a disintegration of the pipe threads which allow the strainer nozzles to become loose with respect to said manifold and thus destroy the effectiveness of the said prior art systems, whereby all the filtering material and underlying gravel must be removed from the filtering tank and repairs made. Furthermore, it is well known that water often carries organic matter and the like which causes the small orifices of the said strainer nozzles to become obstructed, thereby necessitating costly periodical cleaning operations and the present invention aims to obviate many of the undersirable factors of the prior practice.

In the drawing, 10 indicates a tank which may be of any desired height, diameter and capacity or of any selected cross sectional contour such as square, hexagonal or the like, and as specifically shown in the drawing, said tank 10 is depicted round for convenience of illustration.

The tank 10, in use, is usually vertically disposed as shown in Figure 1 as to the longitudinal length of said tank. However, for certain installations, the longitudinal length of the tank may be horizontally disposed. The tank is provided with a conduit 12 normally used for inlet purposes. The inlet conduit 12 is in communication with a source of supply of liquid to be filtered and is provided with any suitable number of valves, not shown, for regulating the quantity of the flow of liquid under pressure into the tank 10.

As shown in Figure 1, within the tank and under the lower end of the conduit 12, a baffle plate 14 is provided which is suitably secured to the top 16 of the tank by any suitable means such as the hanger brackets 18; whereby the liquid to be filtered becomes disbursed laterally and substantially radially with respect to the outlet end of the conduit 12 and the axis of the tank 10.

Within the tank and below the baffle plate 14, a lamination of filtering material, such as sand or the like 20, is provided; said material being supported on a bed of comparatively fine gravel 22. The latter in turn is disposed upon a bed of medium sized gravel indicated at 24. Adjacent to the bottom of the tank 10, a bed or layer of coarse gravel 26 is provided.

The major portion of the weight of said filtering material and gravel is carried by the new device, the latter being generally indicated at 28. The bottom 30 of the tank supports the new device.

Approximately medially of the bottom of the tank 10, a pipe 32 is provided. The latter is normally used for outlet purposes, being welded or otherwise suitably secured to said bottom and, as best shown in Figure 3, in the practice of the present invention, the upper end of the outlet pipe 32 extends above the inner upper surface of said bottom 30 adjacent the longitudinal axis of the tank. The pipe 32 is provided with inner annular screw threads 34 for facilitating an attachment of the new device 28 thereto and in a manner whereby certain later described portions of said device may be seated snugly upon the inner surface of said bottom for purposes later described.

The new device further preferably includes a nipple 36, having a plurality of spaced apart apertures 38 disposed through the vertical wall thereof for a passage of liquid therethrough as later described.

The nipple 36 is threadedly secured to the outlet pipe 32 and preferably is similarly secured to an annular and normally horizontally disposed flange 40. The threaded connection between the pipe 32 and the nipple is preferred in lieu of welding said parts together. When welding is employed, the flange 40 may be more readily dispensed with. For small-sized tanks, the flange 40 is not necessary since the upper end of the nipple may be welded to the lowermost disc 42. Also if desired, the pipe 32 may be provided with the apertures 38 and extend upwardly to the disc 42 and connected to the latter by welding for a non-use of the nipple 36 and flange 40. The nipple 36 is preferably employed for purposes later described.

Upon the upper horizontally disposed surface of the flange 40, a disc, plate or the like, 42 is provided. The disc or member 42 is round in plan for use in combination with a tank which is circular in transverse section and at times when the tank 10 is square in cross section, the member 42 is also square in plan. Similarly for hexagonal tanks, the member 42 is of a corresponding contour in plan.

The perimetrical edge 44 of the member 42 is maintained spaced from the inner surface of the bottom 30 of the tank and against the downward urge provided by the weight of said gravel and filtering material by a suitable means such as the spacing blocks 46. The latter, as best shown by dotted lines in Figure 2, being approximately equidistantly spaced apart for said purpose and in a manner whereby liquid may pass between said edge and said bottom. The space 47 provided by said blocks is such that the gravel 26 cannot pass through the space 47 since said space 47 is of a lesser height, at its entrance, than the diameter of the coarse gravel 26. Also the finer gravel 22 does not pass through said space since the gravel 26 prevents the finer gravel 22 from passing to the lower portions of the tank 10.

The upper annular edge of a collar 48 is welded or otherwise suitably secured to the lower surface of the member 42; said collar being approximately axially disposed with respect to the pipe 32 and tank 10. The lower edge of the collar 48 abuts the inner surface of the bottom 30 approximately snugly, as shown in Figures 1 and 3. The collar 48 is provided with a plurality of notches 50 let in from the lower edge of said collar for a free passage of liquid through said notches. The collar 48 is preferably employed for supporting the weight of said gravel disposed upon the new device 28 and upon the bottom 30 of the tank 10, whereby other portions of the new device may be manufactured of comparatively light weight metal.

For small installations and small tanks, the collar 48 need not be employed.

Above the member 42, a second disc 52 is provided which is similar to the member 42 except that it is of a lesser diameter, as shown in Figure 2. The members 42 and 52 are spaced from each other by means of a spacing ring 54 adjacent to the axis of the disc 52. The perimetrical edge of the member 52 may be rolled and slightly down-turned or so formed by means of a die and press operation and preferably in lieu thereof, is provided with an annular lip portion 56 which is tack-welded or otherwise suitably secured to the outer annular edge of the member 52. The lower edge of the lip extends below the lower surface of the member 52, as shown in Figure 3, whereby the annular flow space, indicated at 58, between the members 42 and 52 is restricted for the purpose of preventing any stray comparatively small particles of gravel to enter said passageway, while at the same time the other portions of the passageway between the members 42 and 52, being larger in a vertical direction, permits an appreciable quantity of debris to accumulate within said larger portions and without impairing the operativeness of the new device.

The ring 54 is provided with a row of apertures 60 for a passage of liquid therethrough and through the medial passageway 62 of the disc 42. The disc 52 is also provided with a like medially disposed passageway 64.

Preferably a third disc 66 is employed for usual purposes or with large-sized tanks. The disc 66 is similar in construction to the heretofore described disc 52 with the exception that it is of a lesser area in plan or diameter. The disc or plate 66 is provided with a lip 68 and is spaced from the disc 52 by means of an apertured spacing ring 70, the latter being similar to the heretofore described ring 54 except that the apertures 71 of the ring 70 are, as shown in Figure 3, of a smaller bore than the bore of the apertures 60 of the ring 54, for permitting only a proportional amount of liquid to flow through the annular opening or flow space 69 and pass toward the outlet pipe 32. While the bore of the apertures 71 are less in diameter than the bore of the apertures 60 for said proportional flow purpose and for purposes later described, obviously a fewer number of the apertures 71 may be employed for said purpose and in the event that the apertures 71 are of the same bore or diameter as the bore of a greater number of the apertures 60.

A ring 72 is employed for spacing the member 66 with respect to a fourth disc 74 which preferably is of heavier construction than the heretofore described discs in order to withstand stress applied by means of the cap screws or connectors 76 at times when the lower ends of the latter are snugly threadedly connected into the flange 40 for rigidly holding all portions of the above described parts together. The disc 52, as shown in Figure 6, is provided with holes 77 through which the screws 76 extend and the other discs are similarly provided with aligned holes for the connectors 76 as shown in Figure 1.

The fourth or upper disc 74 is not necessarily provided with a medially disposed passageway. For use of the device during the herein mentioned back-washing operation, the upper or top disc is not provided with a passageway, but is preferably provided with a down-turned lip or rim portion 78.

The spacing ring 72 is provided with apertures 73 which may be either of smaller bore than the apertures of the ring 70 or the apertures 73 may be fewer for purposes as above described.

Liquid under pressure to be filtered is admitted to the tank 10 through the intake pipe 12 and impinges on the baffle plate 14 as above described. The liquid flows through the granulated bed of filtering material 20 and downwardly through the latter and said layers of gravel to the new device. An initial quantity of liquid will move downwardly following a line of least resistance, possibly in a channel along or in parallelism with one vertical portion of the tank, until the tank 10 is approximately full of the liquid.

During operation, after an initial filling of the tank, since the new device is disposed between the outlet 32 and the major portion of the lower bed of gravel 26, said device causes the liquid to descend evenly through the laminations of filtering material and without the liquid becoming channeled to one side of the tank, whereby all portions of the cross sectional areas of the several laminations of the filtering material are utilized, a refiltration of the liquid is not required and a smaller sized tank may be employed than heretofore for treating a selected quantity of liquid.

In operation, the flow space 47 approximately serves that portion of the interior of the tank which is disposed between the vertically disposed wall of the tank and the perimetrical edge 44 of the disc 42; the flow space 58 approximately serves that portion which is disposed between said edge 44 and the lip 56; the flow space 69 serves, or approximately so, that portion between the lips 56 and 68 and the flow space 80 serves the medial portion, since the weight of the liquid in upper portions of the tank presses the liquid adjacent said flow spaces into the latter, subsequent flow of liquid following a like path, and since the apertures 38, 60, 72 and 73 respectively of the parts 36, 54, 70 and 72 govern the quantity of flow of liquid through said flow spaces and since the size or quantity of the bores of said apertures are proportional to that portion of the interior of the tank served by said passageways the downward flow of liquid through the filtering material is evenly distributed with respect to the cross sectional planes of the several laminations of said material.

As best shown in Figure 3, the arrangement of the several parts of the invention includes a definite relation between the size of the apertures of the several spacing rings and of the nipple 36 and with respect to the capacity of the bore of the outlet 32 and also a definite relation between said apertures and the capacity or cross sectional area of the interior of the tank 10, inclusive of the height of the liquid within the tank or the pressure applied within the tank by reason of the said height of the liquid or the pressure applied extraneously of the tank to said liquid within the tank; said relationship being such that for a tank of larger filtering capacity, the outlet apertures are either proportionally larger or what is, in substance the same, a greater number of apertures are employed disposed through said spacing rings as above described.

It will be noted that the new device may be readily arranged to serve tanks of different size by interchanging the similar rings and nipples thereof, together with adding more or less of the discs, whereby a retail dealer need carry but a comparatively small stock of parts. For tanks above conventional sizes, such as are used in laundries and the like, a large number of discs are employed and readily threadedly attached.

As shown in Figure 2, each disc 52 and 66 is provided on the underneath surface thereof with spacing blocks 55 and 82 respectively which aid in supporting their proportional weight of gravel similarly with respect to the blocks 46.

Preferably the above described spacing rings and nipple are formed of noncorrosive material such as brass or the like In the operation of the filters of zeolite water softening type, including cation and anion exchangers, it is customary that a flow of water be directed downwardly through the tank thereof, and to direct a flow of water under pressure upwardly through said tank for back-washing purposes, the latter operation being for freeing accumulations of sediment from the gravel, said sediment often including iron precipitate and the like and also freeing sediment from the upper portions of the bed of the filtering material employed.

Among other advantages of the invention, it is believed pertinent to mention that the downward flow of liquid during a filtration thereof is caused to be even, as above described, as is essential for efficient water softening and filtering purposes and also it is believed to be obvious that at times when so desired, water under pressure is introduced into the tank through the pipe 32 for what is known to the art as "back-washing" purposes that said water becomes distributed in such a manner that it flows or arises through the beds of filtering material in a column-like and even manner, whereby the passage of said liquid either upwardly or downwardly in a channel to an exclusion of other portions of the tank is prevented, since said even distribution of said liquid during said passage in either direction is caused by the above described cooperative arrangement of parts of the new device.

For use in conjunction with very small tanks such as are employed for serving small dwelling houses, the device may consist of two discs of different size in plan secured together in spaced apart relation, the larger disc having a passageway disposed through it and the wall of the passageway need not be in axial alignment with the outlet pipe of the tank which it serves. Also the larger disc is disposed spaced from the bottom of said tank by a suitable means such as the blocks 46, the collar 48 or the like.

From the foregoing description, it is thought to be obvious that a liquid filtering mechanism constructed in accordance with my invention is particularly well adapted for use by reason of the convenience and facility with which it may be assembled and operated, and it will also be obvious that my invention is susceptible of some change and modification without departing from the principles and spirit thereof and for this reason, I do not wish it to be understood as limiting myself to the precise arrangement and formation of the several parts herein shown in carrying out my invention in practice, except as claimed.

I claim:

1. In a liquid filtering system, at least three discs each having an area in plan different with respect to each other, said discs being arranged in approximate axial juxtaposition progressively smaller in area from one side of the assembly to the other side thereof, discs disposed at one side of the smallest disc each having a substantially medially disposed passageway, spacing rings disposed between said discs in alignment with said passageways, said rings each being provided with at least one aperture disposed through their respective walls, and maintaining means for holding the discs and rings in operative position with respect to each other.

2. In a liquid filtering system as claimed in claim 1 which further includes a nipple secured to the outer side of the largest disc of the assembly and having its bore disposed in axial alignment with the passageway of said largest disc.

3. A liquid filtering system having in combination, a tank provided with an inlet at its top, an outlet at its bottom and laminations of filtering material therein; a plurality of discs within said tank between said bottom and a major portion of said laminations, certain of said discs being provided with passageways, said discs being disposed substantially axially of said tank; apertured spacing rings between said discs in alignment with said passageways, said rings being foraminous for permitting a flow of liquid to said passageways; and a conduit for guiding liquid from said apertures and passageways to said outlet; said discs being arranged progressively smaller in plan from said conduit toward said inlet, the area in plan of each disc being complemental to that portion of the cross sectional area of said tank respectively served by the discs for causing said liquid to descend approximately evenly through said laminations.

4. In a liquid filtering system, at least three discs each having an area in plan different with respect to each other, said discs being arranged in approximate axial juxtaposition progressively smaller in area from one side of the assembly to the other side thereof, discs disposed at one side of the smallest disc each having a substantially medially disposed passageway, spacing rings disposed between said discs in alignment with said passageways, said rings each being provided with at least one aperture disposed through their respective walls, means for uniformly restricting the spaces between said discs adjacent the perimeters of certain of said discs so as to provide a portion of each of said spaces of larger size than the corresponding restricted portion of each of said spaces for minimizing the clogging of said spaces, and maintaining means for holding the discs and rings in operative position with respect to each other.

5. In a liquid filtering system, at least three discs each having an area in plan different with respect to each other, said discs being arranged in approximate axial juxtaposition progressively smaller in area from one side of the assembly to the other side thereof, discs disposed at one side of the smallest disc each having a substantially medially disposed passageway, spacing rings disposed between said discs in alignment with said passageways, said rings each being provided with at least one aperture disposed through their respective walls, annular lips each secured to the perimeter of the smallest of said discs for restricting the spaces between said discs adjacent the perimeters of certain of said discs so as to provide a portion of each of said spaces of larger size than the corresponding restricted portion of each of said spaces for minimizing the clogging of said spaces, and maintaining means for holding the discs and rings in operative position with respect to each other.

6. In a liquid filtering system, at least three discs each having an area in plan different with respect to each other, said discs being arranged in approximate axial juxtaposition progressively smaller in area from one side of the assembly to the other side thereof, discs disposed at one side of the smallest disc each having a substantially medially disposed passageway, spacing rings disposed between said discs in alignment with said passageways, said rings each being provided with at least one aperture disposed through their respective walls, said annular rings each having progressively larger aperture areas, the said areas increasing from those areas in rings disposed between said smaller discs to those areas in rings disposed between said larger discs, and maintaining means for holding the discs and rings in operative position with respect to each other.

CLAYTON W. WOODS.

REFERENCES CITED

The following references are of record in the file of this patent:

UNITED STATES PATENTS

| Number | Name | Date |
|---|---|---|
| 1,111,470 | Krause | Sept. 22, 1914 |
| 1,233,017 | Bartlett | July 10, 1917 |
| 1,692,592 | Stickney | Nov. 20, 1928 |
| 1,828,282 | Dotterweich | Oct. 20, 1931 |
| 2,278,453 | Kracklauer | Apr. 7, 1942 |